United States Patent
Azuma (10) Patent No.: US 8,316,975 B2
(45) Date of Patent: Nov. 27, 2012

(54) FOUR WHEELED VEHICLE WITH AIR-INTAKE APPARATUS FOR ENGINE

(75) Inventor: Shinjiro Azuma, Kako-gun (JP)

(73) Assignee: Kawasaki Jukogyo Kabushiki Kaisha, Hyogo (JP)

(*) Notice: Subject to any disclaimer, the term of this patent is extended or adjusted under 35 U.S.C. 154(b) by 368 days.

(21) Appl. No.: 12/753,340

(22) Filed: Apr. 2, 2010

(65) Prior Publication Data
US 2011/0240250 A1    Oct. 6, 2011

(51) Int. Cl.
*B60K 13/02* (2006.01)
(52) U.S. Cl. ............... 180/68.3; 180/291
(58) Field of Classification Search ........... 180/68.1, 180/68.2, 68.3, 68.4, 68.6, 291; 296/193.09
See application file for complete search history.

(56) References Cited

U.S. PATENT DOCUMENTS

| | | | | | |
|---|---|---|---|---|---|
| 4,557,345 | A * | 12/1985 | Hamane et al. | ............... | 180/229 |
| 5,316,079 | A * | 5/1994 | Hedeen | ..................... | 165/140 |
| 7,059,438 | B1 * | 6/2006 | Sheets | ..................... | 180/68.1 |
| 7,410,025 | B2 * | 8/2008 | Sunaguchi et al. | ............ | 180/229 |
| 8,002,061 | B2 * | 8/2011 | Yamamura et al. | ........... | 180/68.1 |
| 8,016,063 | B2 * | 9/2011 | Tsuchiya | ................... | 180/68.5 |
| 8,037,959 | B2 * | 10/2011 | Yamamura et al. | ........... | 180/68.4 |
| 2008/0308334 | A1 * | 12/2008 | Leonard et al. | ............... | 180/89.1 |

FOREIGN PATENT DOCUMENTS

JP    62-205822    9/1987

* cited by examiner

Primary Examiner — Frank Vanaman
(74) Attorney, Agent, or Firm — Wenderoth, Lind & Ponack, LLP (57) ABSTRACT

A four wheeled vehicle capable of preventing mud, sand, water or other foreign substances, which are splashed by front wheels, from coming into an air cleaner with a simple structure and also shortening an air-intake route. The air-intake apparatus includes an air-intake duct connected to an air-intake portion of an engine, and an air cleaner provided in an upstream air-intake portion of the air-intake duct. An air taking portion of the air cleaner opens in the dashboard of the vehicle. The air-intake duct is arranged at a higher position relative to a floor face of the cabin.

9 Claims, 10 Drawing Sheets

FOUR WHEELED VEHICLE WITH AIR-INTAKE APPARATUS FOR ENGINE

BACKGROUND OF THE INVENTION

1. Field of the Invention

The present invention relates to a four wheeled vehicle with an air-intake apparatus for an engine for supplying combustion air to the engine and, particularly to a four wheeled vehicle for leisure which is mainly suitable for traveling on irregular terrain.

2. Description of the Related Art

Figure 10:
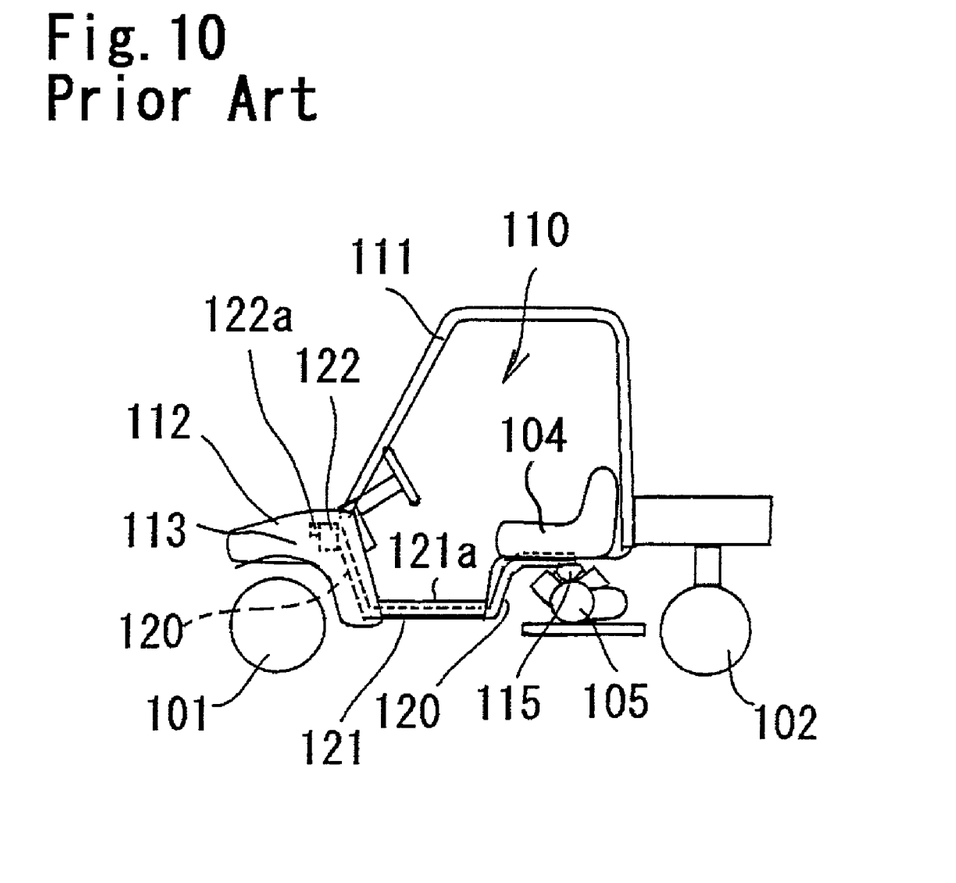
FIG. 10 is a schematic left side view of a related art.

FIG. 10 shows one example of a conventional four wheeled vehicle for leisure. The vehicle is provided with a cabin 110 surrounded by a cabin frame 111 between a pair of right and left front wheels 101 and a pair of right and left rear wheels 102. A seat 104 is installed in the cabin 110, and an engine 105 is arranged on the lower side of the seat 104. A bonnet 112 is provided on the front side of the cabin 110, and the bonnet 112 covers the upper side of a bonnet chamber 113.

An air-intake apparatus for supplying combustion air to the engine 105 includes an air-intake chamber 115 arranged on the upper side of the engine 105, an air-intake duct 120 connected to the air-intake chamber 115, an air cleaner 122 connected to the air-intake duct 120 and the like. The air-intake duct 120 goes down from an upper position relative to the engine 105 to a floor face 121 of the cabin 110, extends forward along the floor face 121, and reaches to the interior of the bonnet chamber 113. A front part of the air-intake duct 120 stands up in the bonnet chamber 113, and the air cleaner 122 is provided in an upper end of the air-intake duct 120. An air taking portion 122a of this air cleaner 122 opens toward the front side in the bonnet chamber 113. A literature of a related art includes Japanese Patent Laying-Open No. 1987-205822.

In the four wheeled vehicle in which the engine 105 is accommodated in the cabin 110 as shown in FIG. 10, major accommodated members or apparatuses to be accommodated in the bonnet chamber 113 are the front part of the air-intake duct 120, the air cleaner 122, a radiator (not shown) and the like, and the lower side of the bonnet chamber 113 is almost entirely open. Therefore, during traveling, mud, sand, water or other foreign substances which are splashed by the front wheels 101 easily come into the air cleaner 122 from the air taking portion 122a. The mud or the like is accumulated on or adhered to the interior of the air cleaner 122. Therefore, there is a case where clogging is generated in a filter element of the air cleaner 122 for a short time, and hence frequency of maintenance and replacement is increased.

The air-intake duct 120 of the four wheeled vehicle shown in FIG. 10 once goes down from an upper part of the engine 105 to the vicinity of the floor face 121 of the cabin 110 or the lower side thereof, extends forward along the floor face 121, and then extends upward to the vicinity of the bonnet 112 in the bonnet chamber 113. Thus, an air-intake route from the air taking portion 122a to an air-intake port of the engine 105 is extended, and air flow resistance is increased so as to cause a decrease in output of the engine.

SUMMARY OF THE INVENTION

The present invention is achieved in consideration with the above problems, and an object of the invention is to provide a four wheeled vehicle capable of preventing mud, sand, water or other foreign substances which are splashed by front wheels from coming into an air cleaner with a simple structure. Another object of the invention is to prevent a decrease in output of an engine by improving piping of an air-intake duct so as to shorten an air-intake route from an air taking portion to an air-intake portion of the engine and decrease air flow resistance.

To achieve the above object, the present invention provides a four wheeled vehicle, including: a cabin provided with a dashboard having an operation panel and a seat; a bonnet chamber placed on the front side of the cabin and covered by a bonnet on the upper side; an engine arranged in the cabin or at a rear position relative to the cabin; and an air-intake apparatus for supplying combustion air to the engine, wherein the air-intake apparatus includes an air-intake duct connected to an air-intake portion of the engine, the air-intake duct extending forward in the cabin, and an air cleaner provided in an upstream air-intake portion of the air-intake duct, and an air taking portion of the air cleaner opens in the dashboard.

According to the above arrangement, the air-intake duct extending from the engine to the bonnet chamber on the front side is provided, and the air taking portion of the air cleaner provided in an end of the upstream air-intake portion of the air-intake duct opens in the dashboard. Thus, it is possible to prevent the mud, the sand, the water or other foreign substances which are splashed by the front wheels from coming into the air cleaner with a simple structure. Thereby, it is possible to reduce clogging of a filter element of the air cleaner and also decrease frequency of maintenance and replacement of the filter element.

Preferably in the above four wheeled vehicle, the air-intake duct extends upward in the bonnet chamber, and the air cleaner is provided in an upper end of the air-intake duct.

According to the above arrangement, a distance between the air cleaner and the ground is extended. Thus, it is possible to reduce a stain on an outer face of the air cleaner due to the mud and the sand, and damage and a stain on the outer face of the air cleaner due to gravel and the like which are scattered from the front wheels.

Preferably in the above four wheeled vehicle, the air-intake duct extends forward at an upper position relative to a floor face of the cabin. Further preferably, a console box rising upward from the floor face is provided on the floor face of the cabin, and the air-intake duct is arranged in the console box.

According to the above arrangement, length of the air-intake route can be shortened in comparison to a conventional structure in which an air-intake duct goes down to a floor face of a cabin. Thereby, it is possible to decrease the air flow resistance and hence suppress the decrease in the output of the engine. Moreover, the number of parts for air-intake is reduced, and the air-intake apparatus can be compactly arranged. Further, since the air-intake duct is accommodated in the console box, there is no anxiety that the air-intake duct is treaded and damaged under a foot of a passenger. As a matter of course, an external appearance is also improved.

In the four wheeled vehicle with the above air-intake apparatus, a radiator may be further provided in the bonnet chamber, and a cooling water supply pipe for supplying cooling water cooled by the radiator to the engine, and a cooling water return pipe for returning warm water after cooling of the engine to the radiator may be arranged in the console box. In this case, preferably, the cooling water supply pipe and the cooling water return pipe are arranged at upper positions relative to the floor face of the cabin. Further preferably, the cooling water return pipe through which the warm water passes may be arranged at a higher position relative to the cooling water supply pipe.

According to the above arrangement, the air-intake duct, the cooling water supply pipe, and the cooling water return pipe are arranged in one console box. Thus, it is possible to compactify piping structures for air-intake and cooling, and also prevent treading of the cooling water supply pipe and the cooling water return pipe under a foot.

Since the cooling water supply pipe and the cooling water return pipe are placed at the upper positions relative to the floor face of the cabin, it is possible to shorten length of the cooling water supply pipe and the cooling water return pipe so as to decrease circulation resistance of the cooling water and also reduce cost for parts. Further, it is possible to reduce an influence of heat released from both the pipes over peripheral parts.

In the four wheeled vehicle in which the cooling water return pipe and the cooling water supply pipe are arranged in the console box, both the pipes may be arranged apart from each other in both ends in the width direction.

According to the above arrangement, it is possible to reduce a mutual thermal influence between the cooling water supply pipe and the cooling water return pipe.

BRIEF DESCRIPTION OF THE DRAWINGS

The above and further object and feature of the invention will more fully be apparent from the following detailed description with accompanying drawings.

DETAILED DESCRIPTION OF THE INVENTION

Embodiment

FIGS. 1 to 6 show a four wheeled vehicle with an air-intake apparatus for combustion air according to the present invention, particularly a so-called four wheeled multi use light vehicle suitable for traveling on irregular terrain. The present invention will be described based on these figures. It should be noted that the directions used in the following description are defined as follows unless otherwise specifically designated. The front side seen from a passenger in the four wheeled vehicle shown in FIG. 1, that is, the side to which the vehicle travels forward, represents the front side of the vehicle and constituent elements of the vehicle. The right and left direction seen from the passenger represents the right and left direction of the vehicle and the constituent elements of the vehicle.

[Arrangement of Entire Four Wheeled Vehicle]

Figure 1:
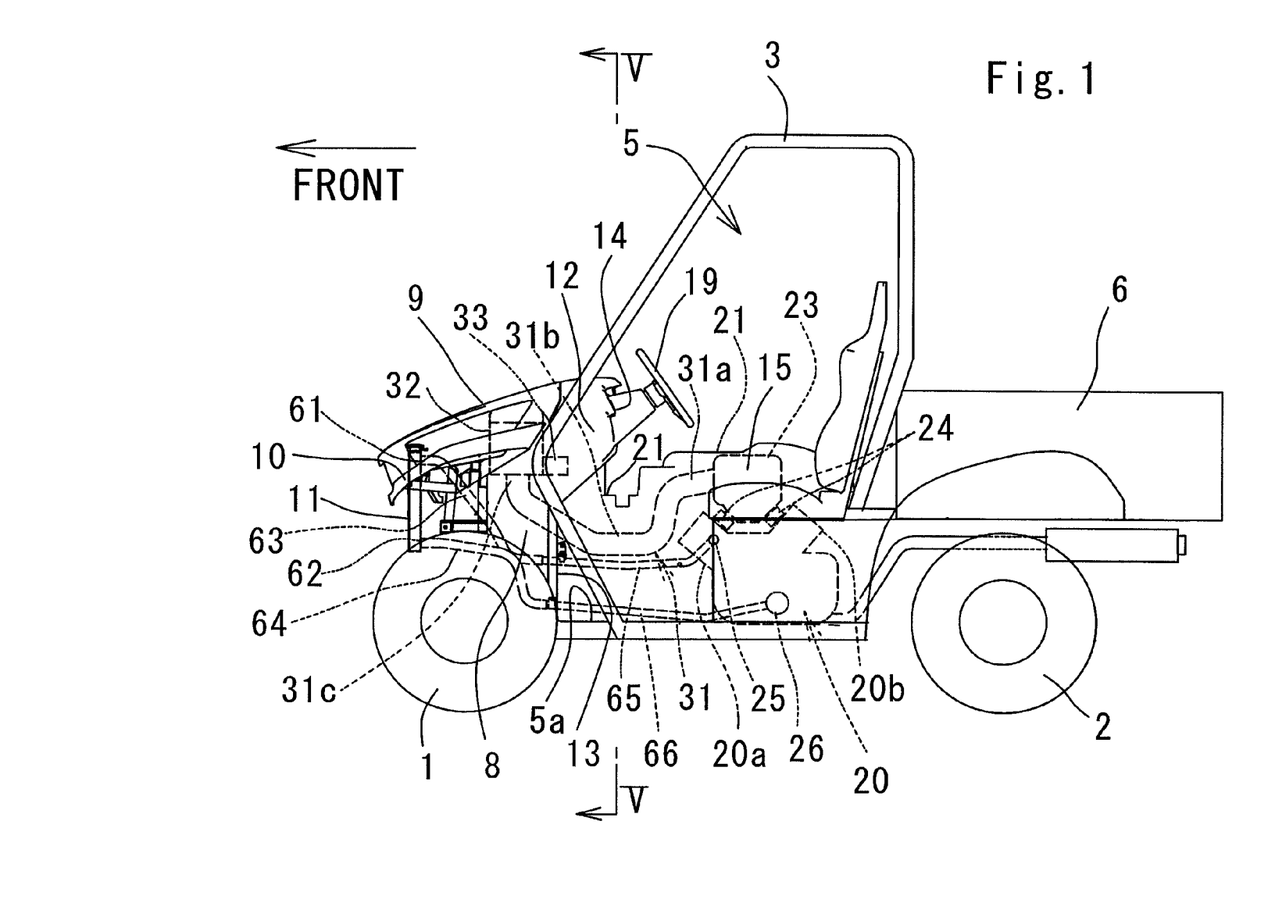
FIG. 1 is a left side view showing one embodiment of a four wheeled vehicle with an air-intake apparatus for an engine according to the present invention.

In FIG. 1 serving as a left side view of the four wheeled vehicle, this four wheeled vehicle is provided with a pair of right and left front wheels 1 in a front part, a pair of right and left rear wheels 2 in a rear part, a cabin 5 surrounded by a cabin frame 3 between the front wheels 1 and the rear wheels 2, and a cargo bed 6 on the rear side of the cabin 5. A bonnet chamber (space) 8 surrounded by the right and left front wheels 1 and a bonnet 9 is provided on the front side of the cabin 5. A pair of front fenders 10 covering the upper side of the right and left front wheels 1 is integrally formed in the bonnet 9. The cabin 5 is not provided with a windshield, side doors, a ceiling wall and the like, and a front part, right and left side parts, an upper part and a rear part thereof are open. The bonnet chamber 8 and the cabin 5 are separated from each other by a dashboard 12 and a partition plate 13. A radiator 11 for engine cooling water is arranged in a front end of the bonnet chamber 8.

Figure 2:
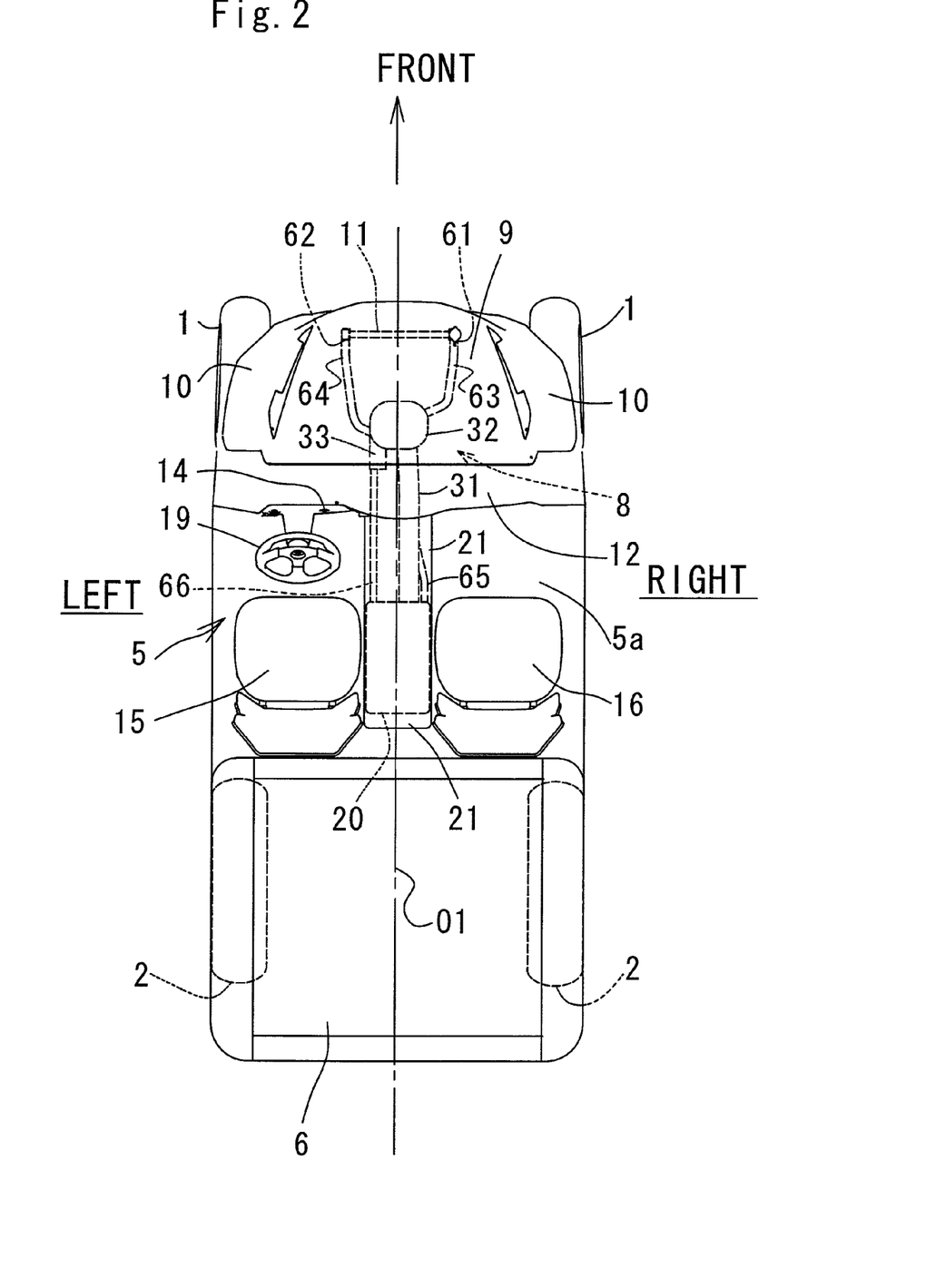
FIG. 2 is a plan view of the four wheeled vehicle in FIG. 1.

In FIG. 2 serving as a plan view of the four wheeled vehicle, a drivers seat 15 on the left side and a passengers seat 16 on the right side are installed in a rear part in the cabin 5. The dashboard (an operation portion) 12 provided in a front part in the cabin 5 is formed in a housing having large space inside. An operation panel 14 to which various meters and switches are attached is provided and a steering wheel 19 for steering the vehicle is provided on a rear face of the dashboard 12.

An engine 20 and a console box 21 covering the upper side and the right and left sides of an upper part of the engine 20 are arranged between the drivers seat 15 and the passengers seat 16. For example, a battery (not shown), electrical components and the like are accommodated in lower space of the drivers seat 15, and for example, a fuel tank (not shown) is accommodated in lower space of the passengers seat 16. A V-belt type continuously variable transmission (not shown) is provided on a left side face of the engine 20. The console box 21 extends forward from a position between the drivers seat 15 and the passengers seat 16 in a center part in the width direction in the cabin 5. A front end of the console box 21 communicates with the interior of the bonnet chamber 8.

Referring to FIG. 1 again, the console box 21 is formed in a box rising from a floor face (a floor plate) 5a of the cabin 5 by fixed height (such as substantially the same height as the drivers seat 15). A gate panel for a shifter, a bottle holder, a tray portion or the like is provided on an upper face of the console box 21.

The engine is a V-type two-cylinder engine having a front cylinder 20a and a rear cylinder 20b. A pair of throttle bodies (or carburetors) 24, 24 and an air-intake chamber 23 connected to both the throttle bodies 24, 24 are arranged in a bank sandwiched by both the cylinders 20a, 20b. The throttle bodies 24,24 are respectively connected to air-intake ports (not shown) of the cylinders 20a, 20b.

A cooling water outlet 25 for discharging warm water after use for cooling of the engine is provided in the front cylinder 20a. A water pump 26 for supplying cooling water to a cooling passage (not shown) in the engine 20 is provided in the vicinity of a lower end of the engine 20.

[Arrangement of Air-Intake Apparatus]

With reference to FIG. 1, arrangement of an air-intake apparatus for taking external air in and supplying the air to the engine 20 via the air-intake chamber 23 and the throttle bodies 24, 24 will be described.

The air-intake apparatus is provided with the air-intake chamber 23, the air-intake duct 31, an air cleaner 32, and an air taking portion 33 in the order from the downstream side of air-intake.

Figure 3:
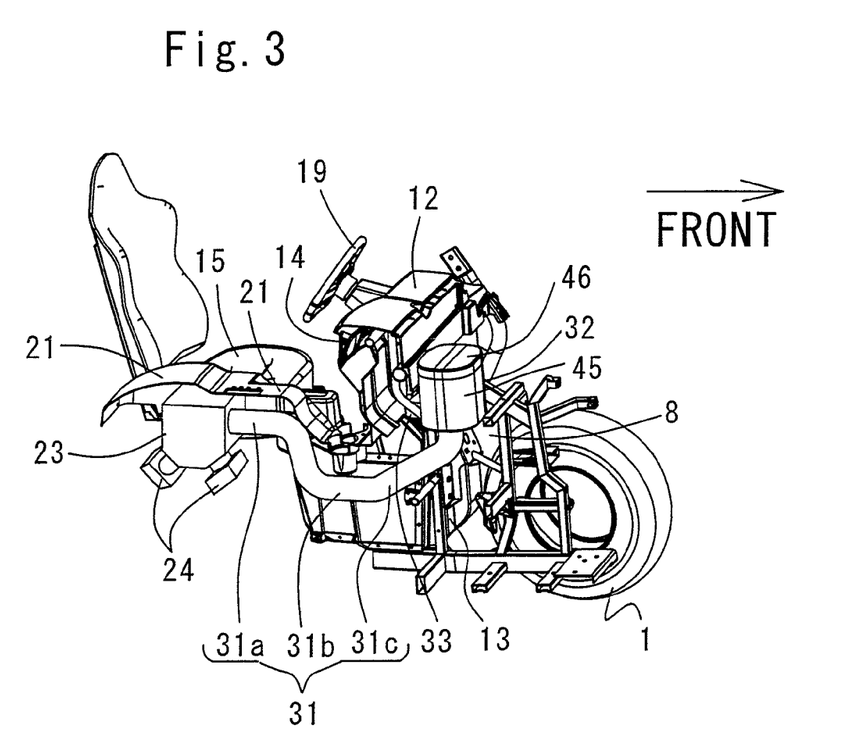
FIG. 3 is a perspective view showing a piping structure for an air-intake duct of the four wheeled vehicle in FIG. 1.

In FIG. 3 serving as a perspective view of the air-intake apparatus, a rear portion (a downstream air-intake portion) 31a of the air-intake duct 31 which is connected to a front face of the air-intake chamber 23 extends forward and bends downward in the console box 21. An intermediate portion 31b of the air-intake duct 31 substantially horizontally extends forward from a lower end of the rear portion 31a in the console box 21. A front portion (an upstream air-intake portion) 31c of the air-intake duct 31 which is connected to a front end of the intermediate portion 31b in the console box 21 extends obliquely front-upward, passes through the partition plate 13, and reaches to the interior of the bonnet chamber 8. The front portion 31c of the air-intake duct 31 further bends upward in the bonnet chamber 8. The air cleaner 32 is connected to an upper end of the front portion 31c.

The air taking portion 33 which is provided in a lower end of the air cleaner 32 extends rearward, comes into space in the dashboard 12, and opens toward the rear side in the dashboard 12. Therefore, the air taking portion 33 takes the air in the dashboard 12 into the air cleaner 32. A lower end of the space in the dashboard 12 communicates with the interior of the bonnet chamber 8, so that the external air can be taken into the space in the dashboard 12 via the bonnet chamber 8 or directly.

Figure 5:
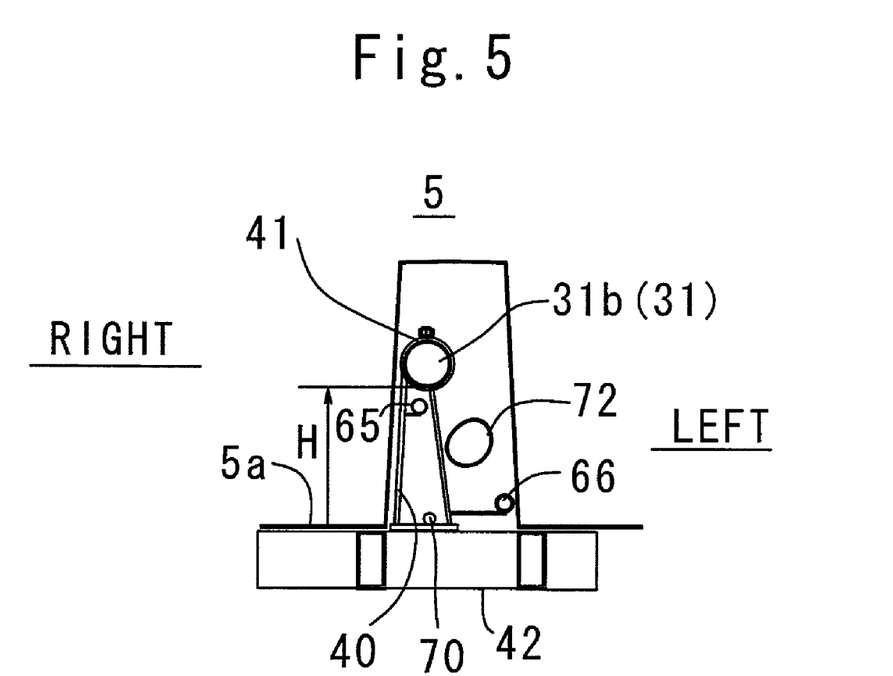
FIG. 5 is an enlarged sectional view taken along the line V-V of FIG. 1.

FIG. 5 is an enlarged sectional view taken along the line V-V of FIG. 1. The intermediate portion 31b of the air-intake duct 31 is arranged on the upper side of the floor face 5a of the cabin 5 by predetermined height H and placed at an upper position in the console box 21, and supported on a vehicle frame member 42 by a support leg 40 and a fastening tool 41. The intermediate portion 31b of the air-intake duct 31 is placed on the right side in the console box 21.

Figure 6:
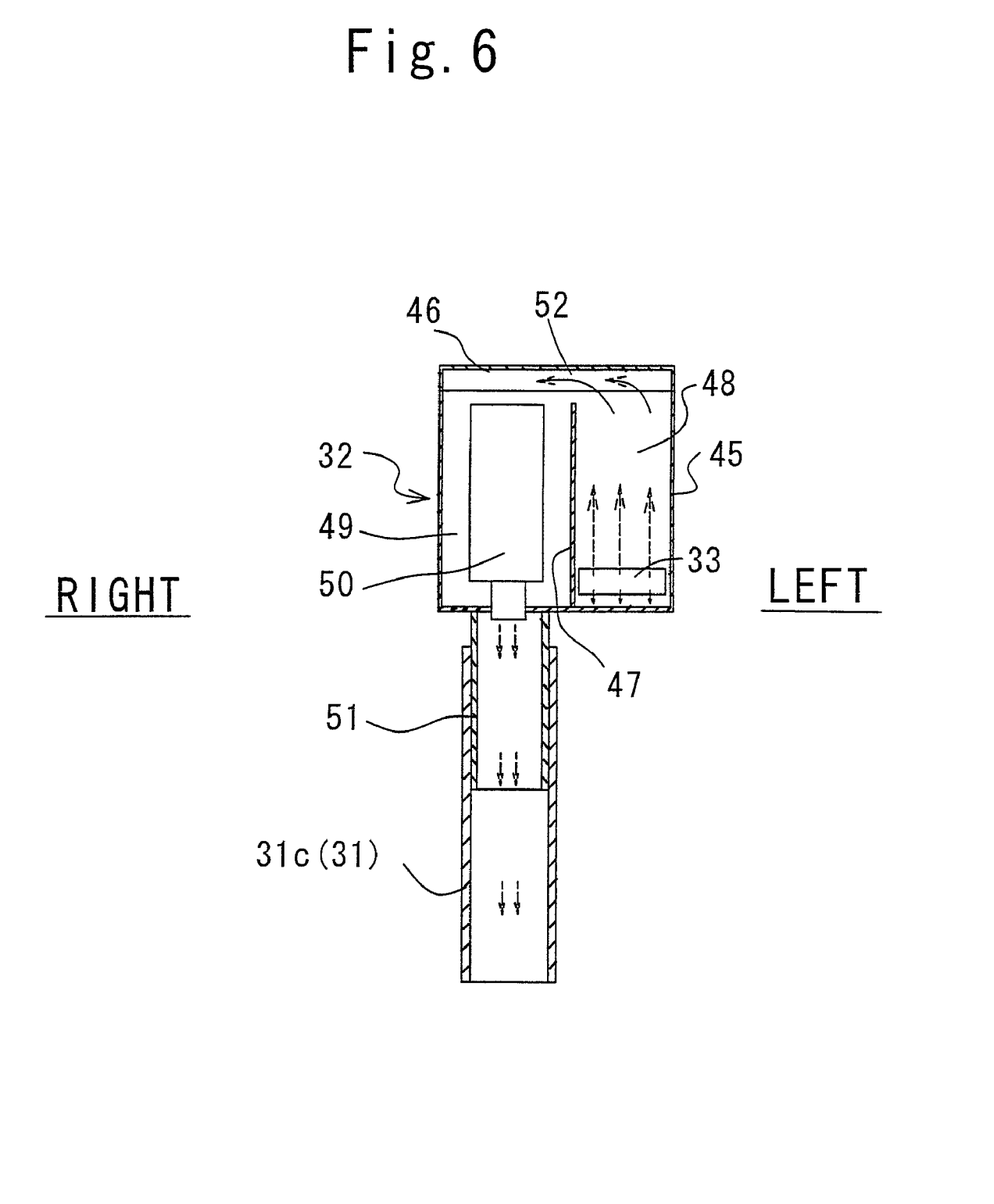
FIG. 6 is a vertically sectional view of an air cleaner.

FIG. 6 is a vertically sectional view of the air cleaner 32. The air cleaner 32 is provided with an air cleaner case 45, and a case lid 46 combined to an upper end of the air cleaner case 45. The interior of the air cleaner case 45 is divided into a preprocessing chamber 48 and an element chamber 49 by a partition wall 47. Both the chambers 48, 49 communicate with each other via a passage 52 on the upper side of the partition wall 47. The air taking portion 33 is formed integrally with the air cleaner case 45, and placed on the lower side of the preprocessing chamber 48. A shape of an air flowing section of the air taking portion 33 is rectangular.

A cylindrical filter element 50 is accommodated in the element chamber 49. An air outlet pipe 51 extending downward is provided in a lower wall of the element chamber 49, and an upper end of the front portion 31c of the air-intake duct 31 is connected to the air outlet pipe 51.

The air taking portion 33 opens in the dashboard 12, so that water or mud does not easily come in. However, the vehicle is an all terrain vehicle, and even in a case where the mud, the water or the like coming into the dashboard 12 is mixed with the air and taken into the air cleaner 32, the mud, the water or the like is divided in the preprocessing chamber 48, the mud or the water is dropped onto a bottom wall of the preprocessing chamber 48, and the air is fed into the element chamber 49 through the passage 52 on the upper side. In the element chamber 49, the air passes through the interior of the filter element 50 from an outer peripheral face of the filter element 50. The purified air is discharged from internal space of the filter element 50 into the front portion 31c of the air-intake duct 31. It should be noted that the mud or the water accumulated in the preprocessing chamber 48 can be properly removed at the time of maintenance. As another method, a discharge port for draining (not shown) may be provided in a lower part of the preprocessing chamber 48 so as to discharge the mud or the water in the preprocessing chamber 48 from the discharge port.

In FIG. 2, the air cleaner 32 is arranged so that the center of the air cleaner 32 in the width direction substantially matches with a width center line O1 of the vehicle. Therefore, the air taking portion 33 is displaced slightly on the left side of the width center line O1.

[Piping Structure for Cooling Water]

With reference to FIG. 1, a piping structure for the cooling water for supplying the cooling water from the radiator 11 to the water pump 26 of the engine 20 and returning the cooling water after cooling of the engine 20 from the cooling water outlet 25 to the radiator 11 will be described.

Figure 4:
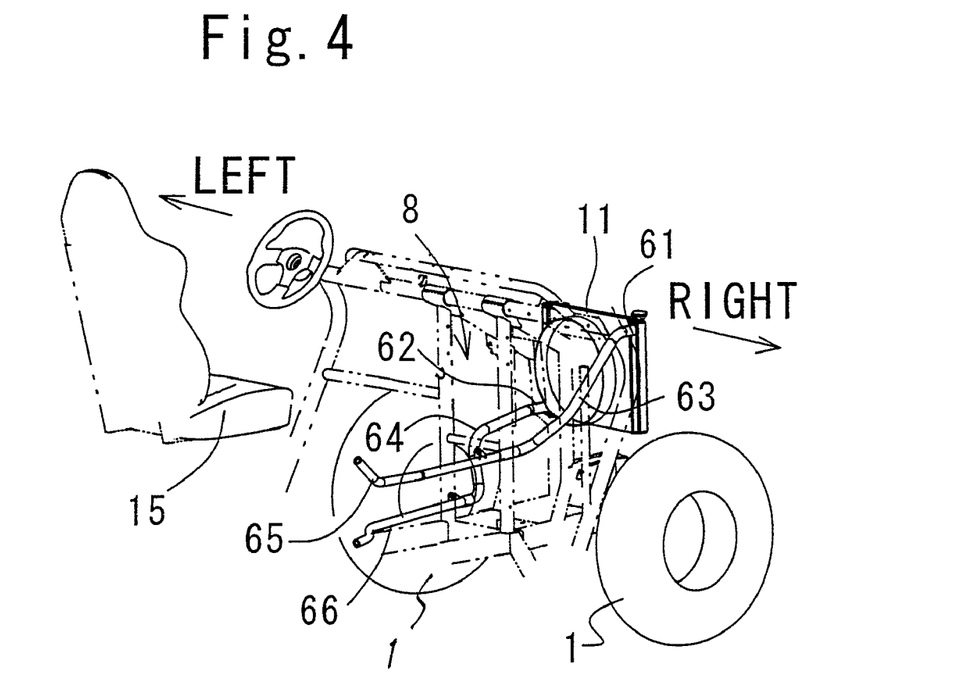
FIG. 4 is a perspective view showing a piping structure for cooling water of the four wheeled vehicle in FIG. 1.

FIG. 4 is a perspective view of the piping structure for the cooling water. A front cooling water return pipe 63 made of metal is connected to a cooling water return port 61 provided in a right upper end of the radiator 11 arranged on the front side of the vehicle. The front cooling water return pipe 63 extends rear-downward in the bonnet chamber 8. A rear cooling water return pipe 65 made of rubber is connected to a rear end of the front cooling water return pipe 63. A front cooling water supply pipe 64 made of metal is connected to a cooling water supply port 62 provided in a left lower end of the radiator 11. The front cooling water supply pipe 64 extends rearward and bends downward in the bonnet chamber 8. A rear cooling water supply pipe 66 made of rubber is connected to a rear end of the front cooling water supply pipe 64.

In FIG. 5, the rear cooling water return pipe 65 and the rear cooling water supply pipe 66 which are arranged at positions apart from each other in the console box 21 extend rearward in the console box 21. The cooling water return pipe 65 and the cooling water supply pipe 66 are arranged to extend in a substantially straight line in the back and forth direction in the console box 21 so that piping length is as short as possible.

The rear cooling water return pipe 65 through which warm water passes is arranged at an upper position on the right in the console box 21 and arranged in the vicinity of the immediately lower side of the intermediate portion 31b of the air-intake duct 31. The rear cooling water supply pipe 66 is placed at a lower position on the left in the console box 21 and arranged in the vicinity of the upper side of the floor face 5a.

The rear cooling water return pipe 65 and the rear cooling water supply pipe 66 are held at upper positions relative to the floor face 5a by the support leg 40 supporting the air-intake duct 31.

A harness 70 bundling various electrical wires and a cooling air duct 72 of the V-belt type continuously variable transmission of the engine 20 are arranged in the console box 21 in addition to the air-intake duct 31, the rear cooling water supply pipe 66, and the rear cooling water return pipe 65. This cooling air duct 72 is placed on the left in the console box 21 and arranged at height between the rear cooling water return pipe 65 and the rear cooling water supply pipe 66.

In FIG. 1, a rear end of the rear cooling water return pipe 65 is connected to the cooling water outlet 25 of the engine 20, and a rear end of the rear cooling water supply pipe 66 is connected to the water pump 26 of the engine 20.

[Operation]

Flows of the combustion air and the cooling water will be described. In FIG. 3, during traveling of the vehicle, the fresh air in the dashboard 12 is taken into the air cleaner 32 by the air taking portion 33. The taken air is purified in the air cleaner 32 and then fed to the air-intake chamber 23 on the rear side through the air-intake duct 31. The air is distributed to the throttle bodies 24, 24 from the air-intake chamber 23, mixed with fuel in the throttle bodies 24, 24, and then supplied into the cylinders 20a, 20b (see FIG. 1).

In FIG. 1, cold cooling water whose heat is exchanged in the radiator 11 successively passes from the cooling water supply port 62 in a lower part of the radiator 11 through to the front cooling water supply pipe 64 and the rear cooling water supply pipe 66 in the console box 21, and then the cooling water is suctioned into the water pump 26 of the engine 20. The cooling water discharged from the water pump 26 passes through a cooling water passage or a cooling water jacket (not shown) in the engine 20 and cools points in the engine 20 so as to become warmed cooling water (warm water). The warmed cooling water is discharged from the cooling water outlet 25 to the rear cooling water return pipe 65 in the console box 21. The cooling water (the warm water) flowing forward in the rear cooling water return pipe 65 passes through the front cooling water return pipe 63 in the bonnet chamber 8 and returns from the cooling water return port 61 in an upper part of the radiator 11 into the radiator 11.

Effect of the Embodiment (1) As shown in FIG. 1, the air taking portion 33 opens in the dashboard 12 and the combustion air is taken in from the interior of the dashboard 12. Thus, it is possible to always take the fresh air in and also prevent the mud, the water, sand, gravel, and other foreign substances which are scattered by the front wheels 1 from coming into the air cleaner 32. Thereby, it is possible to reduce clogging of the filter element 50 in the air cleaner 32 shown in FIG. 6 and also extend replacement timing and maintenance timing of the filter element 50.

It is also possible to reduce a stain on an outer peripheral face of the air cleaner case 45 due to the mud, the sand and the like, and damage due to the gravel.

Figure 7:
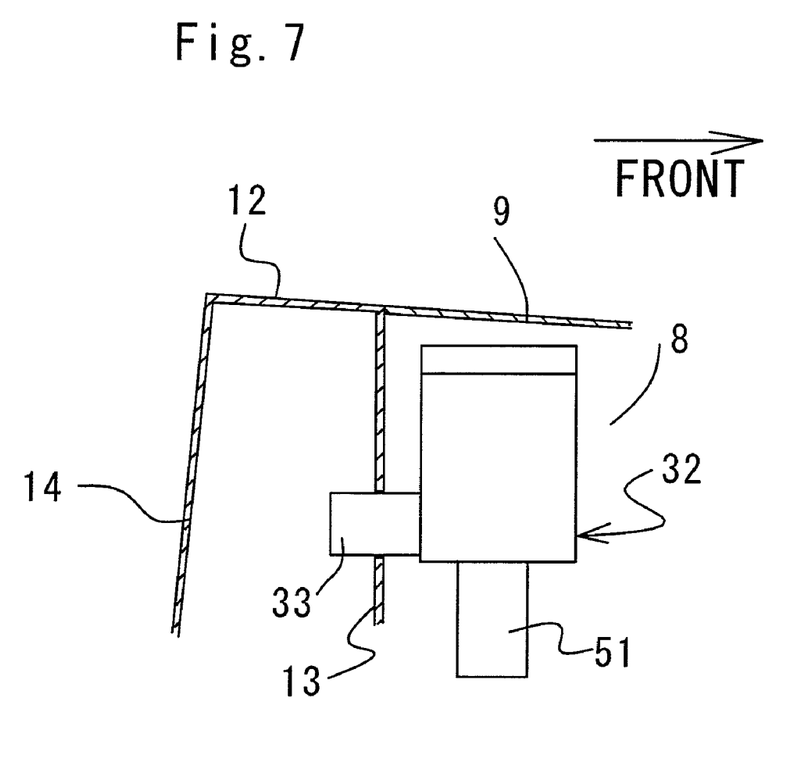
FIG. 7 is a side view of the air cleaner in FIG. 6.

(2) As shown in FIGS. 6 and 7, since the air taking portion 33 of the air cleaner 32 is formed in a lower end of the preprocessing chamber 48, the mud or the water which is heavier than the air does not flow into the side of the element chamber 49 but promptly gather in the preprocessing chamber 48.

(3) As shown in FIG. 1, since the air-intake duct 31 is arranged at a higher position relative to the floor face 5a of the cabin 5, it is possible to shorten an air-intake route from the air cleaner 32 to the air-intake ports of the engine 20. Thereby, it is possible to decrease air flow resistance so as to contribute to improvement in output of the engine 20.

(4) As shown in FIG. 5, the air-intake duct 31, the rear cooling water supply pipe 66, and the rear cooling water return pipe 65 are arranged in the console box 21 in the cabin 5. Thus, the air-intake duct 31, the rear cooling water supply pipe 66, and the rear cooling water return pipe 65 are protected without being treaded under a foot of the passenger getting on/off the cabin 5.

(5) As shown in FIG. 5, the rear cooling water supply pipe 66 and the rear cooling water return pipe 65 in the cabin 5 are arranged at higher positions relative to the floor face 5a of the cabin 5. Thus, it is possible to reduce a thermal influence over peripheral members of the floor face (particularly a thermal influence due to heat release of the cooling water return pipe 66). Furthermore, it is possible to shorten a cooling water supply route and a cooling water return route so as to compactify the piping structure and reduce the number of parts.

(6) As shown in FIG. 5, the rear cooling water supply pipe 66 through which the cooling water cooled by the radiator 11 passes and the rear cooling water return pipe 65 through which the warm water warmed in the engine 20 passes are placed as apart from each other as possible in the console box 21. Thus, the cooling water in the rear cooling water supply pipe 66 is not thermally influenced by the warm water in the rear cooling water return pipe 65.

Figure 8:
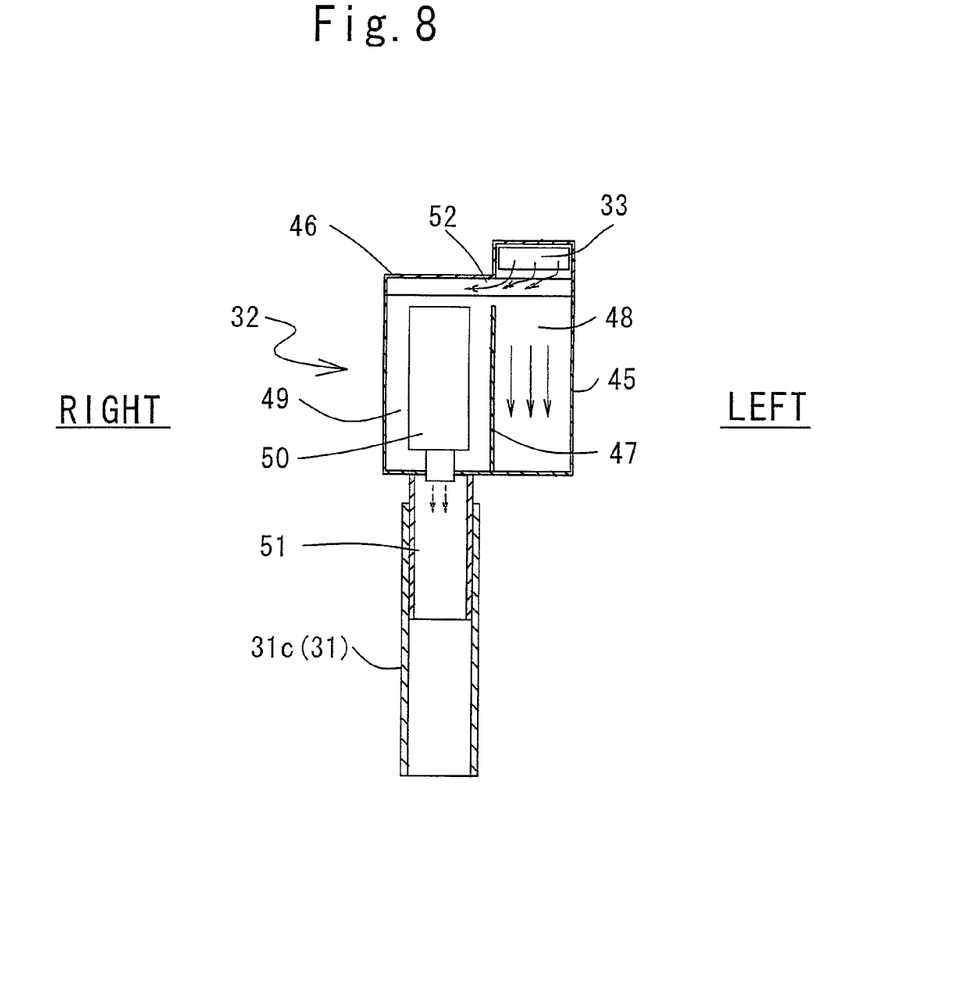
FIG. 8 is a vertically sectional view of a modified example of the air cleaner.
Figure 9:
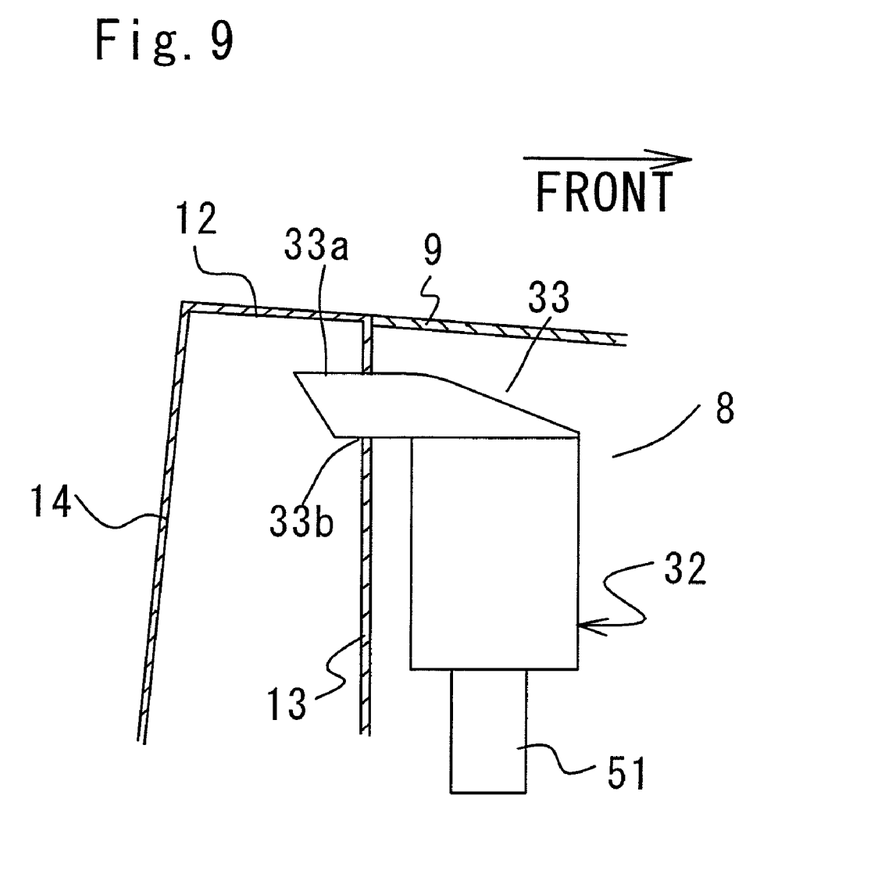
FIG. 9 is a side view of the air cleaner in FIG. 8.

Other Embodiments (1) FIGS. 8 and 9 show a modified example of the air cleaner 32. In FIG. 8, the air taking portion 33 is placed in an upper end of the preprocessing chamber 48 of the air cleaner 32 and formed integrally with the case lid 46. In FIG. 9, a front half part of an upper wall 33a of the air taking portion 33 is inclined so as to be higher on the rear side. The upper wall 33a of the air taking portion 33 protrudes more than a lower wall 33b on the rear side. Other structure is the same as the structure described with reference to FIGS. 6 and 7, and the same members and parts are given the same reference numerals.

According to the structure of FIGS. 8 and 9, since the air taking portion 33 is placed in an upper end of the air cleaner 32, a distance between the air taking portion 33 and the ground is extended. Thus, the mud or the water coming into the dashboard 12 does not easily further come in from the air taking portion 33. Even when the foreign substances are dropped from the upper side, the upper wall 33a can prevent the foreign substances from coming into the air cleaner 32. It should be noted that the mud or the water accumulated in the preprocessing chamber 48 can be properly removed at the time of maintenance. As another method, a discharge port for draining (not shown) may be provided in the lower part of the preprocessing chamber 48 so as to discharge the mud or the water in the preprocessing chamber 48 from the discharge port.

(2) With regard to piping in the console box 21 shown in FIG. 5, positions of the rear cooling water supply pipe 66 and the rear cooling water return pipe 65 may be exchanged with each other.

(3) In the four wheeled vehicle in FIG. 1, a position of the engine 20 in the back and forth direction substantially corresponds to positions of the drivers seat 15 and the passengers seat 16. The present invention may be applied to a four wheeled vehicle in which the engine 20 is arranged on the rear side of the drivers seat 15 and the passengers seat 16.

(4) The present invention may be applied to a four-seater four wheeled vehicle having a cargo bed.

(5) The present invention is not limited to the above embodiments but various modified examples may be adapted within a scope not departing from the claims.

What is claimed is:

1. A four wheeled vehicle, comprising:
   a cabin provided with a seat and a dashboard having an operation panel;
   a bonnet chamber located on a front side of the cabin and covered by a bonnet on an upper side thereof;
   an engine arranged in the cabin or at a rear position relative to the cabin;
   an air-intake apparatus for supplying combustion air to the engine; and
   a partition plate separating the bonnet chamber and a front portion of the dashboard,
   wherein the air-intake apparatus includes an air-intake duct connected to an air-intake portion of the engine, the air-intake duct extending forward in the cabin and into an interior of the bonnet chamber, and an air cleaner arranged in the bonnet chamber and provided in an upstream air-intake portion of the air-intake duct, and
   wherein an air taking portion of the air cleaner extends into a space in the dashboard through the partition plate and opens in the dashboard.

2. The four wheeled vehicle according to claim 1, wherein the air-intake duct extends upward in the bonnet chamber, and the air cleaner is provided in an upper end of the air-intake duct.

3. The four wheeled vehicle according to claim 1, wherein the air-intake duct extends forward on the upper side of a floor face of the cabin.

4. The four wheeled vehicle according to claim 3, comprising:
- a console box provided on the floor face of the cabin, the console box protruding upward from the floor face, wherein the air-intake duct is arranged in the console box.

5. The four wheeled vehicle according to claim 4, further comprising:
- a radiator in the bonnet chamber, wherein
- a cooling water supply pipe for supplying cooling water cooled by the radiator to the engine, and a cooling water return pipe for returning warm water after cooling of the engine to the radiator are arranged in the console box.

6. The four wheeled vehicle according to claim 5, wherein the cooling water supply pipe and the cooling water return pipe are arranged at upper positions relative to the floor face of the cabin.

7. The four wheeled vehicle according to claim 6, wherein the cooling water return pipe through which the warm water passes is arranged at a higher position relative to the cooling water supply pipe.

8. The four wheeled vehicle according to claim 6, wherein the cooling water return pipe through which the warm water passes and the cooling water supply pipe are arranged apart from each other in both ends in the width direction in the console box.

9. The four wheeled vehicle according to claim 7, wherein the cooling water return pipe through which the warm water passes and the cooling water supply pipe are arranged apart from each other in both ends in the width direction in the console box.

\* \* \* \* \*